United States Patent [19]
Hafner et al.

[11] Patent Number: 4,483,484

[45] Date of Patent: Nov. 20, 1984

[54] ELECTROMAGNETICALLY ACTUATABLE VALVE

[75] Inventors: Udo Hafner, Lorch; Waldemar Hans, Bamberg, both of Fed. Rep. of Germany

[73] Assignee: Robert Bosch GmbH, Stuttgart, Fed. Rep. of Germany

[21] Appl. No.: 417,736

[22] Filed: Sep. 13, 1982

[30] Foreign Application Priority Data

Mar. 5, 1982 [DE] Fed. Rep. of Germany ....... 3207917

[51] Int. Cl.3 ........................ B05B 1/30; F16K 31/06; F02M 51/08

[52] U.S. Cl. .................................................... 239/585

[58] Field of Search ................ 239/585; 251/139, 140, 251/141

[56] References Cited

FOREIGN PATENT DOCUMENTS 2072306 3/1980 United Kingdom ................ 251/139

*Primary Examiner*—John J. Love

*Assistant Examiner*—Kevin Weldon

*Attorney, Agent, or Firm*—Edwin E. Greigg

[57] ABSTRACT

An electromagnetically actuatable fuel injection valve for fuel injection systems comprises a valve casing and a first connecting pipe which serves as a magnetic core over which a solenoid winding is disposed. A second connecting pipe is disposed interiorly to the first connecting pipe, the two pipes in combination forming a flow channel for the inflowing fuel. Flow of the fuel is facilitated through a connecting or communicating opening and a blind bore into an interior cavity of valve casing, when it flows further either via an interior bore of the first connecting pipe and a bore of the second connecting pipe. From there the fuel can proceed onward to a return flow line, or else, when the solenoid winding is energized and the valve passage between the seat and head is open, the fluid can be metered through fuel passages and injected from a preparation bore. Any vapor bubbles present in the fuel may escape before they reach the valve seat by passing through the degassing openings leading from the flow channel to the bore of the second connecting pipe.

1 Claim, 2 Drawing Figures

ELECTROMAGNETICALLY ACTUATABLE VALVE

BACKGROUND OF THE INVENTION

The invention relates to an electromagnetically actuatable valve of the type having a casing which includes a first pipe serving as a core for a solenoid winding in the casing, a second pipe concentrically located within the first pipe, and means for channeling fuel through the pipes essentially to a point of delivery, whereby when the solenoid is energized the fuel can be appropriately metered. The object of such valves is to cool the solenoid winding by causing a liquid to flow around it, and to carry away any vapor bubbles which may be present in the flow by means of a return flow line. If vapor bubbles in, for example, a fuel injection valve survive to the point where injection takes place, they may lead to difficult starting of the internal combustion engine and to rough running or even stopping of the engine. A fuel injection valve has been proposed in which two connecting tubes are provided which are concentric to the valve axis over which tubes the fuel can flow to the valve and out of the valve into a return flow line, wherein one of the connecting tubes has a shell-type core. The proposed fuel injection valve is costly to build in terms of funds and resources, and does not ensure that vapor bubbles originating in the fuel entering the valve can be discharged from the valve casing to the return flow line without first having to pass in the neighborhood of the valve seat.

ADVANTAGES OF THE INVENTION

The valve of the present invention has the advantage over the prior art of being small in size and inexpensive to manufacture. In particular, the valve of the present invention provides degassing openings which enable vapor bubbles to pass to the returning fuel stream at a point in the flow upstream of the valve seat and armature, so that these bubbles can avoid passing by or near the armature and valve seat.

BRIEF DESCRIPTION OF THE DRAWINGS

The drawings present a simplified representation of an exemplary embodiment of the invention, described in more detail hereinafter, wherein.

DESCRIPTION OF THE EXEMPLARY EMBODIMENT

Figure 1:
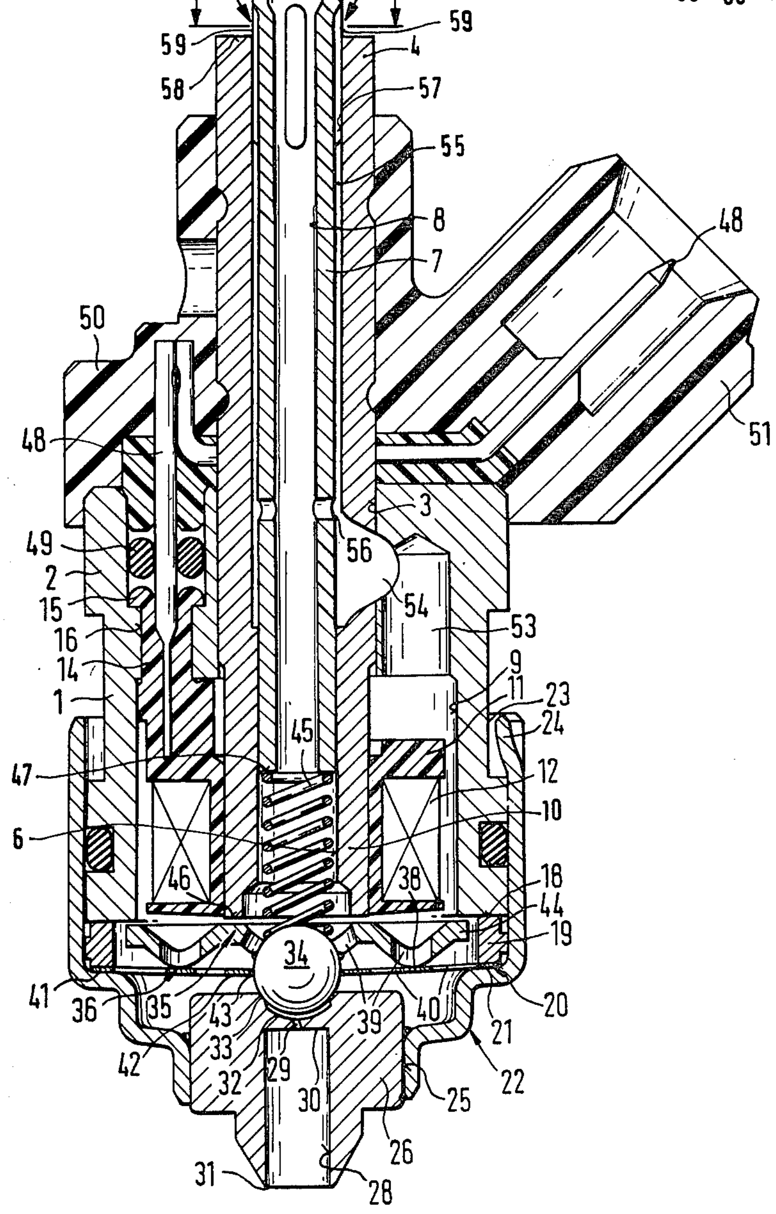
FIG. 1 shows a cross-sectional view of a fuel injection valve according to the invention.

The fuel injection valve shown in the drawings is an example of an electromagnetically actuatable valve for a fuel injection system which serves, e.g., for injecting fuel into the intake tube of an internal combustion engine with externally supplied ignition. The valve casing 1 is fabricated by a stress-free forming operation, such as deep drawig, rolling, or the like, and has a cup-like shaped body 2. A first connecting tubular element 4 is inserted in sealed fashion into a cylindrical bore 3 of body 2. The tubular element 4 is comprised of a ferromagnetic material, and serves as the core of the solenoid winding of the electromagnetically actuated valve. The tubular element extends concentrically along the axis of the valve, and its end 10, which serves as the winding core and projects into an interior cavity 9 of valve casing 1, has an interior bore 6 into which a second connecting pipe 7 is pressed, the latter having a cylindrical flow opening 8. End 10 of first connecting pipe 4 extends into the interior cavity 9 of valve casing 1 and supports an insulating coil carrier 11 which at least partially encloses the solenoid winding 12. The coil carrier 11 and solenoid winding 12 do not completely fill the interior cavity 9, but are housed within it with additional free space, and are axially secured by means of at least one guide pin 14 in conjunction with a bead or snap fastening 15 in an attachment bore hole 16 of the body 2. A spacing ring 19 presses against and is sandwiched between the end face 18 of the valve casing 1 and a guide membrane 20 adjoining said spacing ring. The side of guide membrane 20 opposite from ring 19 engages a shoulder 21 of a nozzle carrier 22, the latter partially surrounding the valve casing 1 and having at its opposite end a portion 24 bent into a holding groove 23 of valve casing 1, whereby an axial tension force is provided for holding the spacing ring 19 and guide membrane 20 in place. Nozzle carrier 22 terminates, beyond shoulder 21, in a cylindrical space 25 for coaxially accepting a nozzle element 26, the space and the nozzle being directed away from the valve casing 1. The nozzle element is attached to the nozzle carrier by such means as, for example, welding or brazing. The nozzle element 26 has a generally blind-end preparation bore 28 with bottom 30. At least one fuel passage 29, which opens to bottom 30, serves to supply the metered amount of fuel. The relationship between each fuel passage 29 and the bottom 30 of the preparation bore 28 is preferably such that no tangentially directed flow is generated in the bore. Rather, the fuel jet exits from each fuel passage 29 without initially contacting the walls of the preparation bore 28, and thereafter, i.e., further downstream, impinges on the walls of the preparation bore where it undergoes dispersion with film formation. In this way, a film of approximately parabolic shape is developed whereby the fuel moves toward the open end 31 of preparation bore 28 and breaks away therefrom. Each fuel passage 29 is disposed at an angle to the axis of the preparation bore, and extends between a cup-shaped space 32, which is formed in the nozzle element 26 and said preparation bore 28. Said nozzle element also has an arcuate valve seat 33 formed on it, which cooperates with a spherical valve head or valve part 34. In order to minimize dead space, the volume of the cup-shaped space 32 is preferably designed to be as small as possible when the valve head 34 abuts against the valve seat 33.

Valve head 34 is connected on its side facing away from valve seat 33 to a flattened, plate-like armature 35 of radially corrugated, cylindrical shape. This connection may be accomplished, for example, by brazing or soldering. The armature 35 may be formed by stamping or pressing, and may have, for example, a ring-shaped guide section 36 in the form of a raised area which presses against a ring-shaped guide region 38 on the guide membrane 20 on the side of membrane 20 which faces away from the valve seat 33. Flow openings 39 in the armature 35 and flow ports 40 in the guide membrane 20 allow the fuel to flow unhindered through the armature 35 and the guide membrane 20. Guide membrane 20 is attached to the casing by compression in a compression region 41 on the outer circumference of the membrane, lying between the spacing ring 19 and the shoulder 21. Membrane 20 has a centering region 42 surrounding a centering opening 43 through which the movable valve head 34 extends and by which the valve head 34 is radially centered. The plane in which guide membrane 20 is compressed to affix it to the casing between the spacing ring 19 and the shoulder 21 runs through, or as closely as possible to, the center of the spherical valve head 34 when said valve head is pressed against the valve seat 33. The guide region 38 of guide membrane 20 engages guide section 36 of armature 35 so as to guide the armature in such a manner as to keep it as parallel as possible to the end surface 18 of valve casing 1. Outer operating region 44 of armature 35 partially radially overlaps the end face 18. A compression spring 45 is contained in the interior bore 6 of the end 10 of the first connecting pipe 4, the said end extending to within a short distance above the armature 35. One end of spring 45 engages and is preferably affixed to valve head 34, and the other end engages the end 47 of the second connecting pipe 7, where the spring forces the valve head 34 in the direction of the valve seat 33 and away from end 47 of the pipe 7. The force exerted by spring 45 is adjustable by shifting the second connecting pipe 7 axially within first pipe 4. Advantageously, the end of the first connecting pipe 4, which end serves as the winding core, is inserted into the valve casing 1 to a point where a small air gap remains between the end face 46 of pipe 4 facing the armature 35 and the armature itself. This air gap exists when the solenoid winding 12 is not energized, wherein the armature assumes a position in which an air gap is also formed between the end face 18 and the operating region 44. In this way the armature is prevented from sticking to the end 10 of the first connecting pipe 4. After the necessary air gap is set, the first connecting pipe 4 is advantageously brazed or soldered to the casing body 2. The magnetic circuit extends externally over the valve casing 1 and internally over the fuel pipe 4, and is closed via armature 35.

Current is supplied to solenoid winding 12 via contact lugs 48, which have the plastic coil carrier 11 injection-molded around them for part of their extent and extend out from casing 1 on the other side via attachment bore holes 16 in the casing body 2. In this way, the contact lugs can run at an angle to the valve axis, as shown. The contact lugs 48, which are partially sheathed in the region of guide pins 14 of the coil carrier 11, are encircled by sealing rings 49 for sealing the attaching bore holes 16. A plastic cap 50 is injection molded around, and at least partially envelops, the contact lugs 48 along with the part of the first connecting pipe 4 which extends out of the valve casing 1, and casing body 2. This cap includes a plug connector 51 in the region of the ends of the contact lugs 48.

Fuel is fed to the interior cavity 9 of the valve casing 1 via a blind bore 53 in the body 2 of valve casing 1, and a connecting opening 54 runs completely through the first connecting pipe 4 and partly through the body 2 to interconnect the blind bore 53 and an annular flow channel 55 which channel is formed, e.g., by a generally ring-shaped recess 57 in the first connecting pipe 4 and runs between the first, and the second, connecting pipes 4 and 7, respectively. The ring-shaped recess 57 opens at the end face 58 of the first connecting pipe 4 which pipe extends outside the valve casing 1, and said recess at its other end preferably extends between the first and second connecting pipes less than the entire length of the second connecting pipe 7, so that the second connecting pipe 7 is adequately guided in the internal bore 6 of the first connecting pipe 4. In the neighborhood of the end face 58 of the first connecting pipe 4, the second connecting pipe 7 has projecting areas 59 which position the second connecting pipe 7 in the ring-shaped recess 57 of the first connecting pipe 4 with a force fit.

Figure 2:
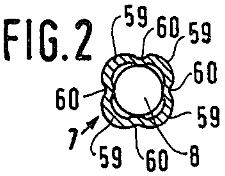
FIG. 2 is a cross-sectional view along line II—II in FIG. 1.

As shown in FIG. 2, projecting areas (preferably four in number) 59 may be provided which extend over a certain length of second connecting pipe 7 in the axial direction, thereby forming axial grooves 60 between adjacent projecting areas 59 within this region. With this arrangement, the fuel enters above end face 58 in the direction of arrows 61 and flows through grooves 60 from a fuel supply, for example a fuel manifold tube, into the annular flow channel 55. The fuel arriving through channel 55 then flows over connecting opening 54, through blind bore 53, and into the interior cavity 9 of the valve casing 1. Thereafter the fuel flows around the coil carrier 11 and solenoid winding 12 and may flow via the interior bore 6 of the first connecting pipe 4 and the bore 8 of the second connecting pipe 7 out to a return flow line, in the direction of arrows 62. When the solenoid winding 12 is energized and thus the armature 35 is drawn upward, the valve opening between valve seat 33 and valve head 34 opens, and part of the arriving fuel is metered to at least one fuel passage 29 and is injected via the preparation bore 28.

There is a hazard, particularly after the engine is stopped, that fuel will be vaporized in the valves and fuel lines due to heat transferred from the internal combustion engine to the injection valve, and this vaporized fuel can lead to interference with restarting. Vapor bubbles of this origin can accumulate in the blind bore 53 and can pass through connecting openings 54 to flow channel 55, which, for example, communicates with the bore 8 of the second connecting pipe 7 via degassing openings 56 in the wall of the second connecting pipe 7. These degassing openings are approximately at the elevation of the connecting opening 54. The degassing openings 56 enable vapor bubbles, which are carried along with the flowing fuel through the flow channel 55, to be passed back to the return flow system before they are carried to the neighborhood of valve seat 33 of the fuel injection valve, and thus before they can cause problems such as by interfering with proper injection. The connecting opening 54 which extends through or across the first connecting pipe 4 and through part of the body 2 is advantageously formed by means of a known electromachining process, after which the connecting pipe 4 is fixed in the body of the valve casing 1.

Another advantage of the inventive valve, beyond its simple construction and small size, is that functional disturbances as a result of vapor bubbles in the controlled liquid are suppressed to the maximum attainable degree.

What is claimed and desired to be secured by Letters Patent of the United States is:

1. In an electromagnetically actuatable valve, particularly a fuel injection valve for fuel injection systems in internal combustion engines, including a valve casing, a solenoid winding and core held in place in the interior cavity of said valve casing, liquid flowing in the cavity and around said winding, an armature for cooperatively moving a valve head against the force of a compression spring relative to a fixed valve seat, a first connecting pipe disposed concentrically with the valve axis, and a second pipe disposed interiorly of said first connecting pipe, such that a flow channel for the liquid is formed between said first and second connecting pipes, said flow channel ending above the end of said second connecting pipe which is directed toward said armature, said channel being in communication with a central bore of said second connecting pipe through at least one degassing opening in said second connecting pipe, and one end of said first connecting pipe being fixed to said valve casing and extending into the interior cavity of said valve casing to serve as said core for said winding.

* * * * *